United States Patent [19]
Beretta

[11] Patent Number: 5,831,686
[45] Date of Patent: Nov. 3, 1998

[54] METHOD AND APPARATUS FOR ADJUSTING CORRELATED COLOR TEMPERATURE

[75] Inventor: Giordano Bruno Beretta, Palo Alto, Calif.

[73] Assignee: Canon Information Systems, Inc., Costa Mesa, Calif.

[21] Appl. No.: 636,754

[22] Filed: Apr. 19, 1996

Related U.S. Application Data

[62] Division of Ser. No. 981,437, Nov. 25, 1992, Pat. No. 5,532,848.

[51] Int. Cl.⁶ .............................. H04N 5/58; H04N 9/73
[52] U.S. Cl. ..................... 348/602; 348/655; 250/205; 250/214 AL
[58] Field of Search ........................... 358/527; 348/227, 348/223, 602, 655; 250/214 AL, 205

[56] References Cited

U.S. PATENT DOCUMENTS

| | | |
|---|---|---|
| 3,315,029 | 4/1967 | Suhrmann . |
| 4,574,319 | 3/1986 | Konishi . |
| 4,742,387 | 5/1988 | Oshima ................................. 348/603 |
| 4,764,670 | 8/1988 | Pace et al. ............................. 250/226 |
| 4,773,761 | 9/1988 | Sugiyama et al. ..................... 356/405 |
| 4,876,166 | 10/1989 | Wake et al. ................................ 430/7 |
| 4,894,683 | 1/1990 | McGuire et al. ........................ 355/71 |
| 4,922,089 | 5/1990 | McGuire et al. ...................... 250/205 |
| 4,947,207 | 8/1990 | McGuire et al. ........................ 355/35 |
| 4,959,755 | 9/1990 | Hochstein ................................. 362/4 |
| 4,978,892 | 12/1990 | Petrakus et al. . |
| 4,979,803 | 12/1990 | McGuckin et al. . |
| 5,008,739 | 4/1991 | D'Luna et al. ......................... 358/21 |
| 5,021,875 | 6/1991 | Iida et al. . |
| 5,037,201 | 8/1991 | Smith, III et al. ..................... 356/326 |
| 5,048,955 | 9/1991 | Bernhard ............................... 356/213 |
| 5,053,299 | 10/1991 | Hanrahan et al. ......................... 430/7 |
| 5,087,937 | 2/1992 | Frick et al. . |
| 5,099,313 | 3/1992 | Suemoto et al. . |
| 5,109,248 | 4/1992 | Petrakus et al. . |
| 5,137,364 | 8/1992 | McCarthy .............................. 356/402 |
| 5,241,374 | 8/1993 | Yang et al. . |

FOREIGN PATENT DOCUMENTS

| | | |
|---|---|---|
| 0238036 | 9/1987 | European Pat. Off. . |
| 491131 | of 1992 | European Pat. Off. . |

(List continued on next page.)

OTHER PUBLICATIONS

MacDonald, Lindsay W., "Colours in the mind", Computer Graphics, Proceedings of the Conference, Nov. 1, 1989, pp. 295–309.

"Color Equalization", by J. Schwartz, Journal Of Imaging Science And Technology, vol. 36, No. 4, Jul./Aug. 1992, pp. 328–334.

Color Measurement Theme And Variations, by D.L. MacAdam, pp.94–101.

Primary Examiner—Scott Rogers
Attorney, Agent, or Firm—Fitzpatrick, Cella, Harper & Scinto

[57] ABSTRACT

A color printing system includes a central processing unit for generating color image data, a color monitor for displaying color image data generated by the central processing unit and a color temperature sensing device for sensing color temperature of viewing light in which color images displayed on the monitor and color images printed by the printer are viewed. A first light source has a light output intensity controllable by the central processing unit. The central processing unit is adapted to control the intensity of the first light source in accordance with the color temperature sensed by the sensing device so as to match the color temperature sensed by the sensing device to a potential color temperature. Additionally, a second light source may be provided. The second light source has a different color temperature than the first light source and the central processor can adjust the intensity of the first and second light source based on relative color temperatures. The central processing unit is adapted to adjust the color temperature of either or both intensity of the first and second light sources.

8 Claims, 14 Drawing Sheets

FOREIGN PATENT DOCUMENTS

| | | |
|---|---|---|
| 0491131 | 6/1992 | European Pat. Off. . |
| 3526590 | 7/1985 | Germany . |
| 3526590 | 1/1986 | Germany . |
| 3622043 | 1/1988 | Germany . |
| 61-133795 | 6/1986 | Japan . |
| 61-172495 | 8/1986 | Japan . |
| 3-250533 | 11/1991 | Japan . |
| 9106173 | 5/1991 | WIPO ............................ H04N 1/46 |
| 92-17982 | 10/1992 | WIPO . |
| WO92/17982 | 10/1992 | WIPO . |

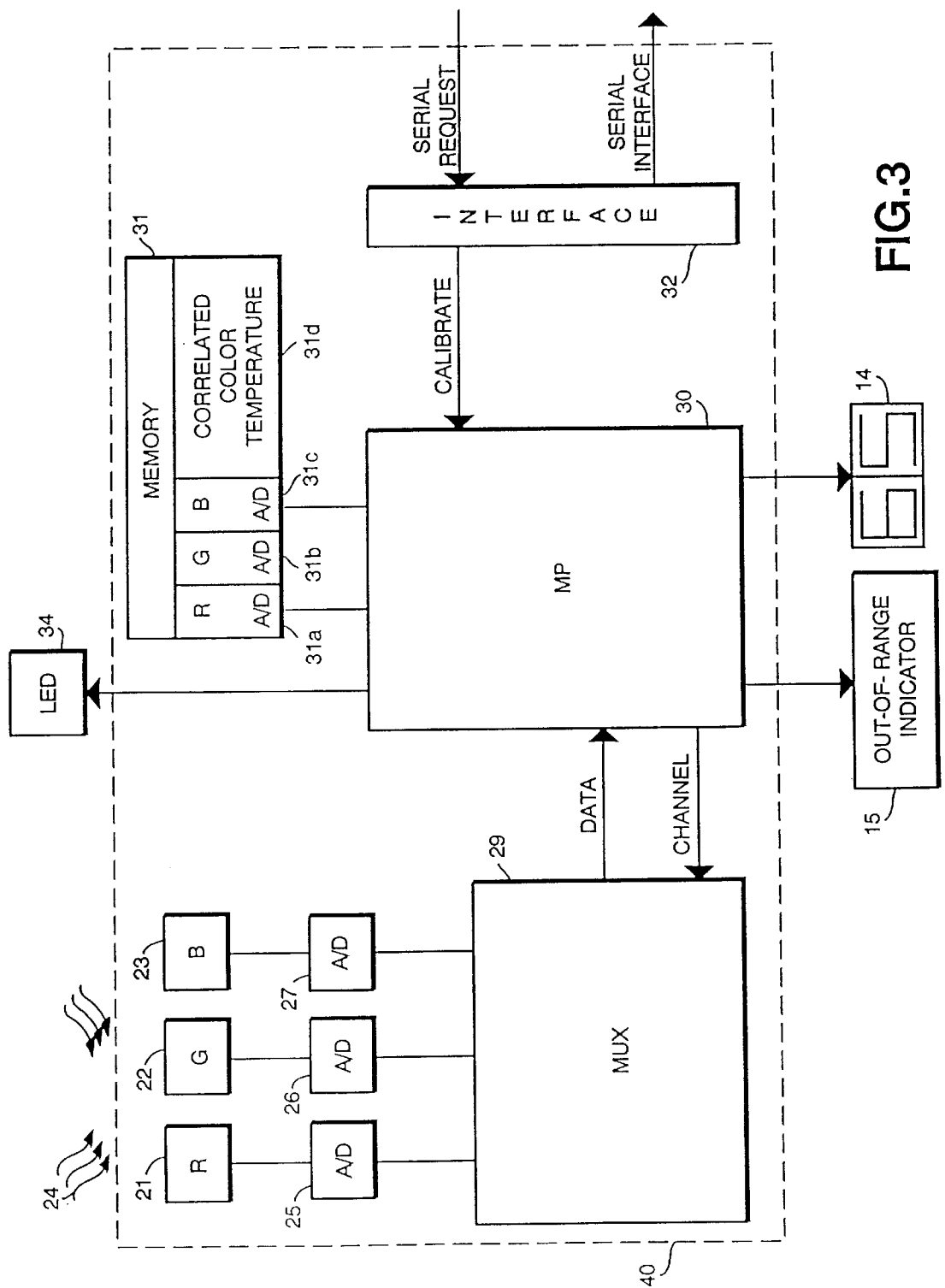

| FIG.7(a) | FIG.7(b) |

METHOD AND APPARATUS FOR ADJUSTING CORRELATED COLOR TEMPERATURE

This application is a division of application Ser. No. 07/981,437 filed Nov. 25, 1992 U.S. Pat. No. 5,532,848.

BACKGROUND OF THE INVENTION

1. Field of the Invention

The present invention relates to adjusting correlated color temperature in accordance with a detection of ambient or projected light. In particular, the invention relates to a method and apparatus for automatically equalizing correlated color temperature of a displayed image and correlated color temperature of viewing light, for example, by adjusting colors in the displayed image and/or by adjusting light sources so as to vary correlated color temperature of viewing light.

2. Description of the Related Art

In color reproduction fields such as commercial printing and photography, it is known that the correlated color temperature of the viewing light affects the way in which an observer perceives a color image. More particularly, an observer will perceive the same color image differently when viewed under lights having different correlated color temperatures. For example, a color image which looks normal when viewed in early morning daylight will look bluish and washed out when viewed under overcast midday skies.

Correlated color temperature is characterized in color reproduction fields according to the temperature in degrees Kelvin (°K) of a black body radiator which radiates the same color light as the light in question. FIG. 1 is a chromaticity diagram in which Planckian locus (or hereinafter "white line") 1 gives the temperatures of whites from about 1500° K to about 10,000° K. The white color temperature of viewing light depends on the color content of the viewing light as shown by line 1. Thus, the aforementioned early morning daylight has a white color temperature of about 3,000° K (hereinafter "D30") while overcast midday skies has a white color temperature of about 10,000° K (hereinafter "D100"). A color image viewed at D60 will have a relatively reddish tone, whereas the same color image viewed at D100 will have a relatively bluish tone.

Because of these perceptual differences, conventional color reproduction practice accepts 5,000° K (hereinafter "D50") as a standard white color temperature. In accordance with this convention, commercial color reproduction facilities ordinarily evaluate color images for color fidelity in a room whose light is controlled to a white color temperature of D50.

Recently, however, low-cost high-quality color reproduction equipment has become available to individual users. Such users are not ordinarily in a position to provide a room having ambient light controlled to D50. And, even if such rooms are available, the color image is not ordinarily displayed in a room whose ambient light is D50. Rather, such color images are more likely to be displayed in rooms not having a white color temperature of D50 and may, for example, be used in an office building as part of a business presentation where the viewing light is far different from D50.

Since the white color temperature affects the perception of color, it has been proposed to modify the colors in a color image based on a measurement of white color temperature of the viewing light. For example, "Color Equalization" by J. Schwartz, *Journal Of Image Science And Technology*, Vol. 36, No. 4, July/August, 1992, suggests to equalize a color image based on the white color temperature of viewing light by adjusting the amount of individual inks used during a printing process based on the color temperature of the viewing light.

Heretofore, however, it has not been possible to measure the white color temperature of viewing light and to automatically adjust a color image producing apparatus or viewing light in accordance with the detected white color temperature. That is, conventionally, once a white color temperature of viewing light had been determined, printing equipment, photography equipment, etc., had to be adjusted manually to match or accommodate the viewing light. However, manual adjustment of equipment or light sources is complicated, time consuming, and generally requires trained technicians. Consequently, setting up controlled lighting conditions for viewing and displaying a color image throughout several unrelated locations is very difficult and very expensive.

SUMMARY OF THE INVENTION

It is an object of the present invention to address the foregoing difficulties.

The invention provides a digital color temperature sensor which provides a digital signal of white color temperature in response to a digital request to provide the white color temperature. The color temperature sensor device includes calibratable color sensors, and is most preferably fabricated on a single substrate or on a single VLSI chip.

According to this aspect of the invention, a color temperature measuring device for measuring the color temperature of light comprises a substrate, a sensor fixed to the substrate for individually sensing the plural color components of light incident on the sensor and for providing plural corresponding digital color component signal representative of the color components, a memory fixed to the substrate for storing correction data for correcting the digital color component signals from the sensor, and a processor also fixed to the substrate and including a digital interface. The processor receives the plural digital color component signals from the sensor, accesses the correction data in the memory to correct the plural digital signals in accordance with that correction data, derives a white color temperature from the corrected color component signals, and in response to a request to provide a white color temperature, outputs the white color temperature on the digital interface. The digital interface may be provided by an input/output (I/O) interface which may also receive the request. The interface may be addressable, thereby allowing the device to be connected to a serial line and monitor the serial line for requests that are specifically addressed to it. An alarm may also be provided to indicate that the sensed digital color component signals pertain to a light source whose chromaticity is outside the range of the white line.

In addition to the foregoing sensing mode, the device may also be operable in a calibration mode, and in this case may be provided with an internal light source such as an LED by which new correction data for the sensors may be derived. In response to a command for entering the calibration mode, the device sequences the light source through a series of different light levels, and rather than providing white color temperature on the digital interface, the device provides the plural digital color component signals. Based on those signals, new correction data is derived, and the correction data is written, via the interface, back to the memory.

This brief summary of the invention is provided so that the nature of the invention may be understood quickly. A fuller understanding may be obtained by reference to the following detailed description of the invention in connection with the appended drawings.

BRIEF DESCRIPTION OF THE DRAWINGS

FIG. 3 is a functional block diagram of a color sensing device according to the invention.

FIGS. 12 through 14 are flow diagrams showing methods for matching the viewing light temperature, in which FIG. 12 is a flow diagram for adjusting the viewing light temperature to match a desired color temperature such as D65, FIG. 13 is a flow diagram by which a monitor temperature is adjusted to the viewing light temperature, and FIG. 14 is a flow diagram by which viewing light temperature is matched to that of a monitor.

DETAILED DESCRIPTION OF THE PREFERRED EMBODIMENT

Figure 2:
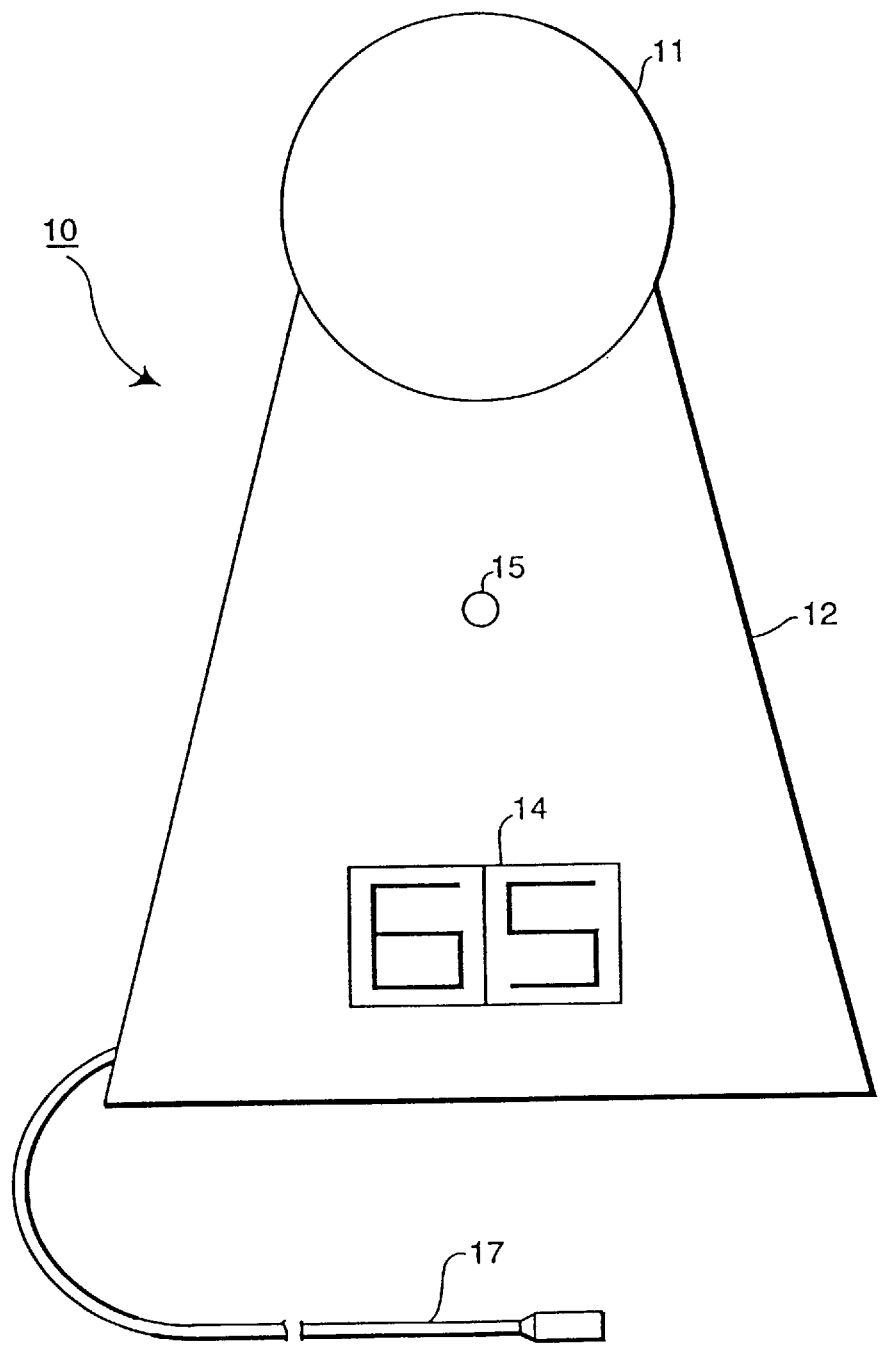
FIG. 2 is a perspective view of a color sensing device according to the present invention.

FIG. 2 is a perspective view of a correlated color temperature sensing device 10 according to the invention. The color sensing device includes a measuring head 11 comprised of an integrating sphere or a diffusing hemisphere by which ambient light such as light by which color images are viewed is collected and presented uniformly to a light sensor. In the case where the light sensing elements are integrated in a single substrate as described below, measuring head 11 contains that substrate. Measuring head 11 is mounted on base 12 which provides support for optional display 14 and alarm indicator 15. Display 14 displays a correlated color temperature of the light striking measuring head 11; in FIG. 2 the numerals "65" are displayed indicating a correlated color temperature of 6,500° K or "D65"; and alarm indicator 15 visually warns when the light incident on measuring head 11 is so highly hued that it cannot be considered to be a white light and correspondingly does not have a correlated color temperature. The operation of indicator 15 is described in more detail below in connection with FIG. 4.

Serial cable 17 provides a digital I/O interface by which the sensor receives requests and/or commands for operation and by which the sensor provides a digital output of correlated color temperature. A suitable serial convention such as RS-232 may be used.

FIG. 3 is a block diagram showing the functional construction of a correlated color temperature sensor according to the invention. The correlated color temperature sensor includes three photosensors 21, 22 and 23, each for sensing a separate color component of ambient light 24 and for providing an analog signal representative thereof. In the present case, sensor 21 senses the red color component and provides an analog signal therefor, sensor 22 senses the green color component of light 24 and provides an analog signal therefor, and sensor 23 senses the blue color component of light 24 and provides an analog signal therefor. In addition, there may be an optional sensor 21a for measuring the blue contribution R1 to the red signal R. In this fashion, detection accuracy would improve. Each of the analog signals is converted by respective analog to digital (A/D) converters 25, 26 and 27 and the converted digital signals are led to multiplexer 29.

In response to channel information from microprocessor 30, multiplexer 29 provides a selective one of the digital signals from A/D converter 25, 26 or 27 via a data line to the microprocessor 30. Microprocessor 30 may be implemented as a logical gate array, but more preferably it is a programmable microprocessor such as NEC V53. For each digital color component signal, microprocessor 30 accesses memory 31 for correction data to correct the digital signal for non-linearities, inconsistencies and other errors in sensors 21, 22 and 23. Specifically, memory 31 includes areas 31a, 31b and 31c for storing correction data for the red channel, the green channel and the blue channel. The correction data may be in the form of a simple bias and gain adjustment, but preferably the correction data is in the form of a look-up table by which the digital data from one of the A/D converters is used to look-up a corrected value for that data.

It is also possible to provide measuring head 11 with a temperature sensor which is sampled by multiplexor 29 and an associated A/D converter to provide microprocessor 30 with the temperature of the sensors 21, 22 and 23 in the sensor head. In this case, the correction data also includes corrections based on temperature so as to allow microprocessor 30 to calculate temperature-compensated R, G, and B light quantities.

After correcting each of the R, G and B components for ambient light 24, microprocessor 30 refers to a correlated color temperature table 31d stored in memory 31.

Figure 1:
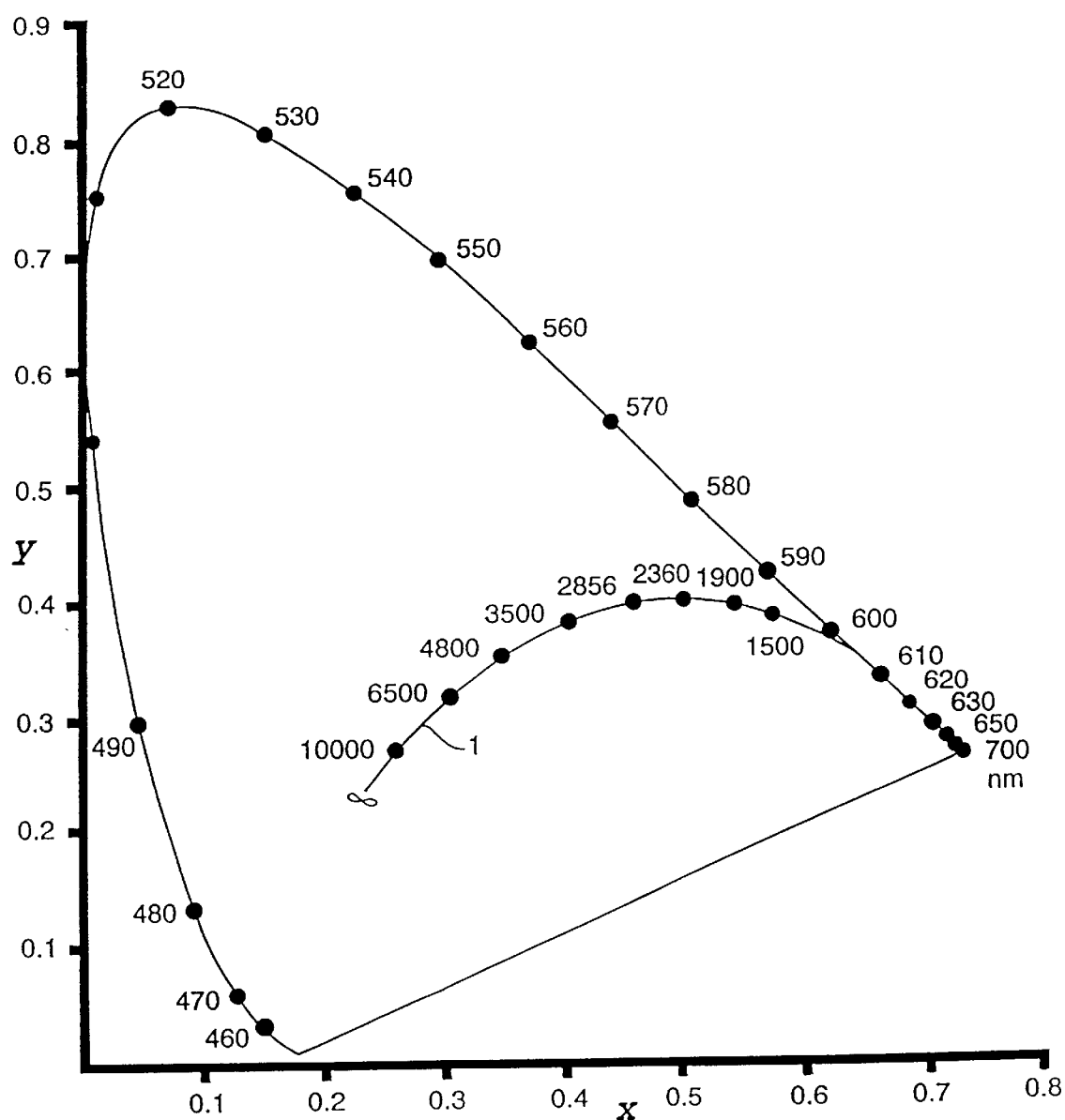
FIG. 1 is a chromaticity diagram showing the Planckian locus (or hereinafter "white line") in CIE space.

Correlated color temperature table 31d provides a correlated color temperature based on the corrected R, G and B digital signals. Correlated color temperature refers to a situation in which the color content of ambient light 24 is not exactly equal to any of the white colors indicated on line 1 of FIG. 1. The correlated color temperature is defined as the temperature of the black body radiator whose perceived color most closely resembles that of the given black body radiator at the same brightness and under the same viewing conditions.

Figure 4:
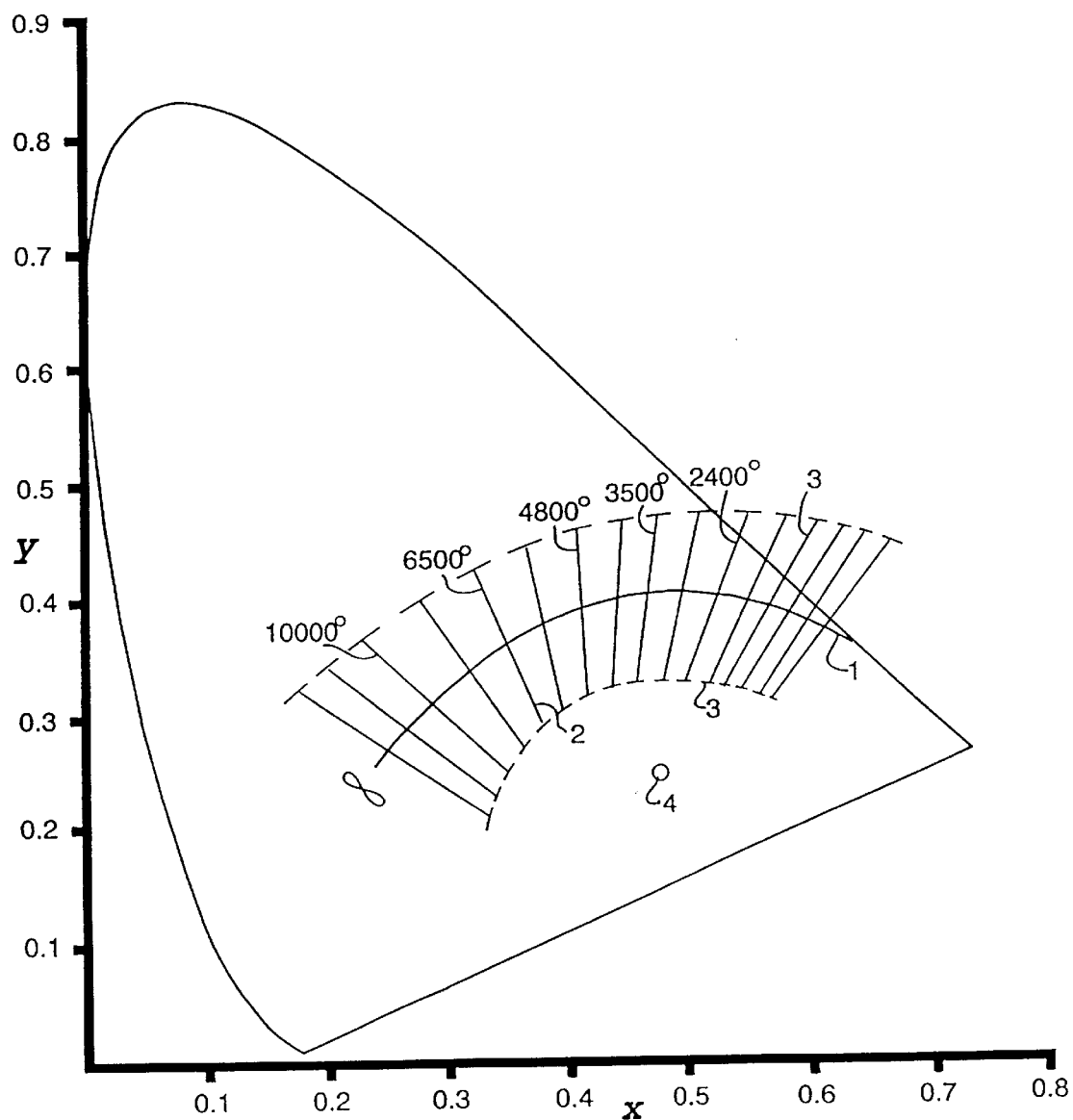
FIG. 4 is a CIE chromaticity diagram showing isotemperature lines which give correlated color temperatures for illumanants which do not fall directly on the white line of FIG. 1.

FIG. 4 shows isotemperature lines in CIE 1931 (x, y) space. Line 1 is the same white line shown in FIG. 1. The additional lines which are approximately perpendicular to line 1 are isotemperature lines. The values stored in the correlated color temperature table 31d are such that colors falling on one of the isotemperature lines are followed back along that line until it meets white line 1. The correlated color temperature is considered to be the temperature at which white line 1 is met. Thus, for example, ambient light whose color is such that its RGB values place it at the point indicated by reference numeral 2, then the correlated color temperature of the ambient light is 6,500° K or D65. In this situation, even though the ambient light departs from a pure white color, its departure is not so great as to consider it non-white, even though points above the white line 2 appear slightly greenish while points below the white line 1 appear slightly pinkish.

On the other hand, light whose color components place it approximately outside the areas indicated by dashed lines 3 are so hued that they can no longer be considered white. For light whose colors are outside the dashed region 3, such as light indicated by point 4, microprocessor 30 uses correlated color temperature table 31d to generate a non-white indicator which is used to illuminate out of range indicator 15.

The correlated color temperature derived from correlated color temperature table 31d is utilized to generate a signal to illuminate indicator 14. Thus, in the case of light whose color places it at point 2, a signal "65" is generated corresponding to the 6,500° K color temperature of that light.

Reverting to FIG. 3, microprocessor 30 is preferably provided with a serial interface by which it may provide a digital signal representative of the correlated color temperature not only to indicator 14 but also onto a serial line for communication to other digital equipment such as a personal computer. Interface 32 shown in FIG. 3 may be constructed of a conventional universal asynchronous receiver/transmitter ("UART") by which serial requests received on serial line 17 may be processed and, if appropriate, a digital signal representative of the correlated color temperature may be provided.

In addition to the color sensing mode described above, microprocessor 30 may also be programmed to provide a calibration mode. In such a calibration mode, microprocessor 30 does not output correlated color temperatures, but rather outputs uncorrected digital R, G and B signals. More particularly, in response to a command to enter a calibrate mode, which is illustrated schematically as a command from the serial line but which may also be a command formed from a simple push-button switch operation, microprocessor 30 enters a calibration mode by which uncorrected R, G and B values are output. The output values are compared with expected RGB output values. Thus, for example, those values are compared with calibrated values which are expected by exposing the sensor to calibrated light. The expected values for each of the R, G and B components, together with the actual, uncorrected values for each of the R, G and B components are assembled into the R, G and B correction tables 31a, 31b and 31c. The new correction data are provided to microprocessor 30, for example, over the serial interface, where they are stored in memory 31.

In connection with the calibrate mode, the sensor may be provided with a self contained light emitting device such as LED 34. In response to a command to enter the calibration mode, microprocessor 30 controls LED 34 to illuminate at various pre-designated intensity levels. Since LEDs have stable color temperature values over their lifetimes, the uncorrected R, G and B output values may be compared readily to those that are expected from the pre-designated levels to which the LED is illuminated, thereby forming correction data for tables 31a, 31b and 31c.

While LED 34 is illustrated as a single, whitish-output, LED, it is also possible to provide separate LEDs, such as a red, green and blue LED, whose combined light provides a whitish light. In this case, the LEDs should be arranged so as to project light into measuring head 11 so as to allow the light to mix before illuminating the color sensors, thereby to minimize color crosstalk.

Figure 3A:
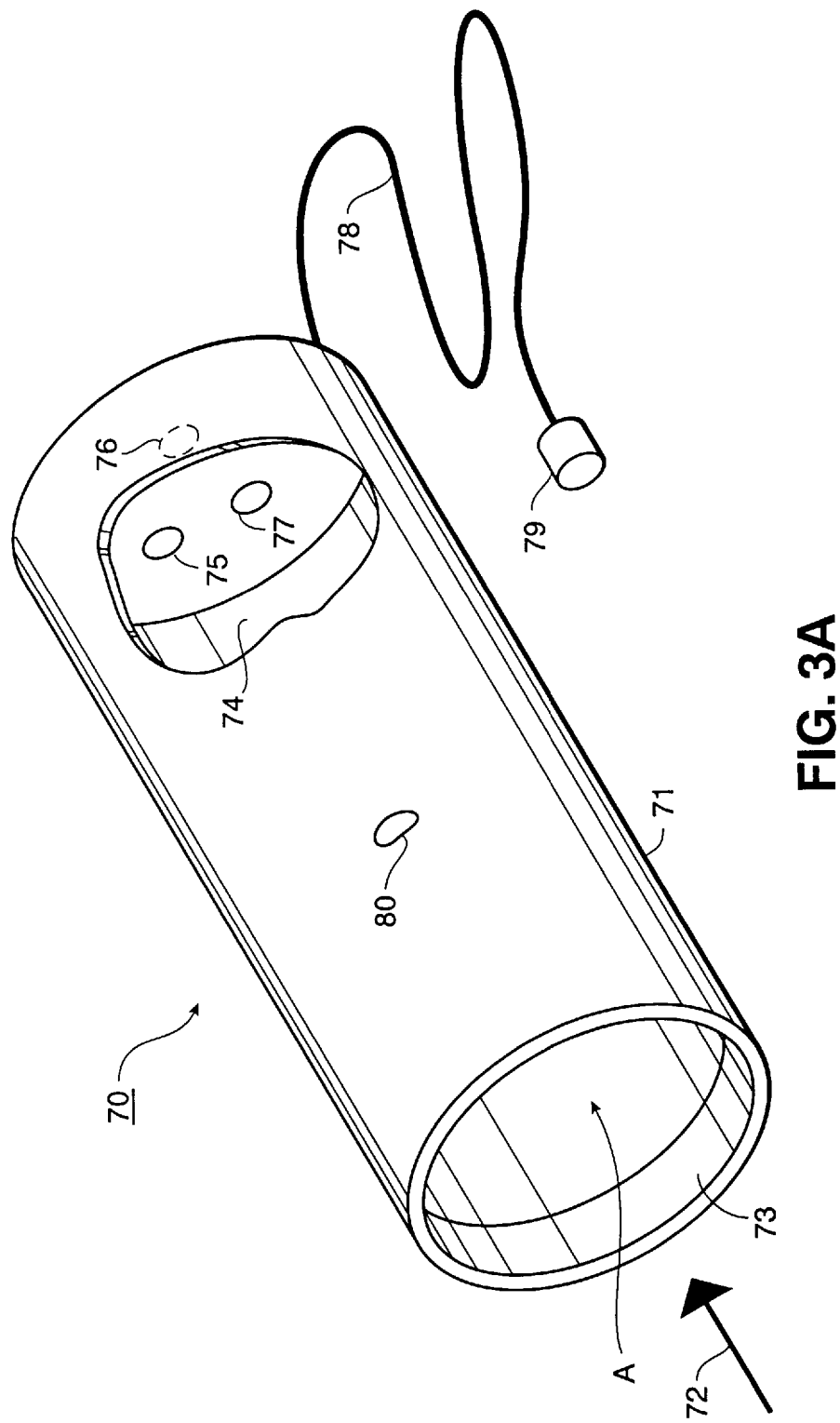
FIG. 3A is a calibration device for calibrating the color sensing device.

It is also possible to provide calibration LEDs in a separate calibration device. For example, FIG. 3A illustrates a perspective view with a cut-out section of the calibration device which could be used to calibrate the color temperature sensing device of the present invention. Calibration device 70 consists of hollow cylinder 71 having opening 72 at one end. Opening 72 is large enough to allow the color temperature sensing device to enter in the direction of Arrow A.

Cylinder 71 has approximately the same diameter opening 72 as the measuring head 11 of the color temperature sensing device so that cylinder 71 fits snugly over measuring head 11 in order to prevent stray light from entering the tube. To this end, the walls of bottom portion 73 of cylinder 71 are painted black so as to form a light adsorbing surface. The remaining interior 74 is coated with a white lining consisting of any substance normally used for perfect white diffusers, such as polished opal glass, ceramics, and fluorinated polymer. At the opposing end of opening 72 of cylinder 71, there is disposed three light emitting diodes (LEDs) 75, 76 and 77. Each LED is mounted for good heat dissipation on the top portion of cylinder 71.

LEDs 75, 76 and 77 are each of a different color and preferably, red, green and blue. In this manner, when LEDs 75, 76 and 77 emit light simultaneously, the combined colors mix to white. Any number of LEDs may be used in any proportion to obtain a predetermined correlated color temperature. For example, blue LEDs often emit less light than red LEDs so that in order to obtain white, blue LEDs should be present in a larger proportion. Moreover, the individual LEDs may be illuminated independently in order to obtain the same effect.

Power is supplied to calibration device 70 through cable 78 from plug 79. Plug 79 is a feed through RS-232C connector and a Data Terminal Ready Line may be used to branch off the required energy to calibrating device 70.

An optional LED 80 may be mounted to the extension of cylinder 11 to indicate to an operation that calibration device 11 is operational.

The calibration device is illustrated in FIG. 3A as a cylinder, but other configurations are possible, such as an integrating sphere having an entrance aperture for receiving light from the LEDs and an exit aperture for emitted mixed LED illumination light. An internal baffle may be provided to ensure light from the LEDs is shielded from direct emission through the exit aperture.

To use, the calibration device 70 is placed over color temperature sensor 10 which is operated in the calibration mode. The calibration device 70 exposes the color sensors to whitish light and the microprocessor 30 returns uncorrected RGB values as described above. The uncorrected RGB values are compared with expected RGB values and calibration tables are derived therefrom.

Figure 5:
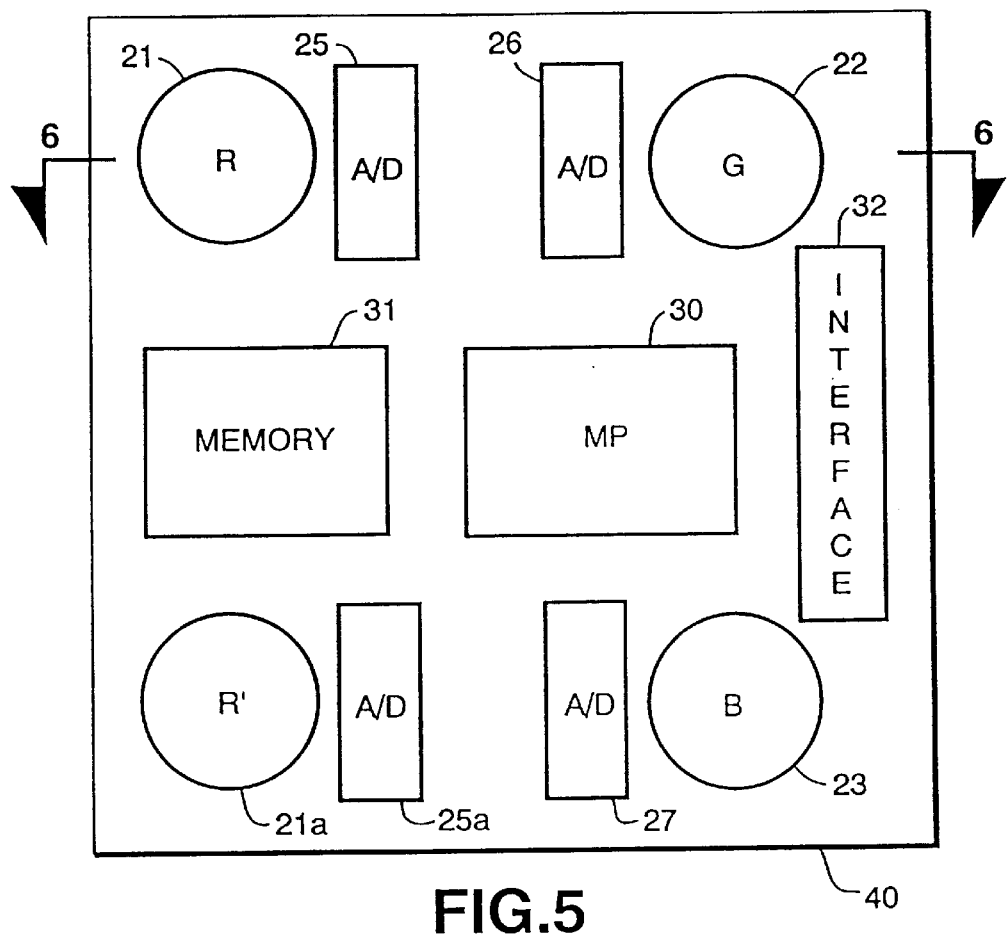
FIG. 5 is an elevational view of the physical arrangement of the components shown in the FIG. 3 block diagram.

FIG. 5 is an elevational view of the structure of the sensor shown in the FIG. 3 block diagram.

As shown in FIG. 5, the color temperature sensor is fabricated on a substrate 40, which is shown as a dotted line in FIG. 3, in which are integrated or fixed the color component sensors 21, 22 and 23, the A/D converters 25, 26 and 27, microprocessor 30, memory 31, and interface 32. The device shown in FIG. 5 is also provided with an additional color sensor 21a and corresponding A/D converter 25a which is designed to sense the blue contribution of the red signal and which may provide more accurate tristimulus R, G and B values. Substrate 40 may be a non-conductive substrate to which the individual components shown in FIG. 5 are mounted, but more preferably substrate 40 is a VLSI chip on which the components shown in FIG. 5 are fabricated in accordance with known VLSI techniques. Not shown in FIG. 5 are connectors for interconnecting between the individual elements on substrate 40 and for providing external access to the color temperature sensor.

Figure 6:
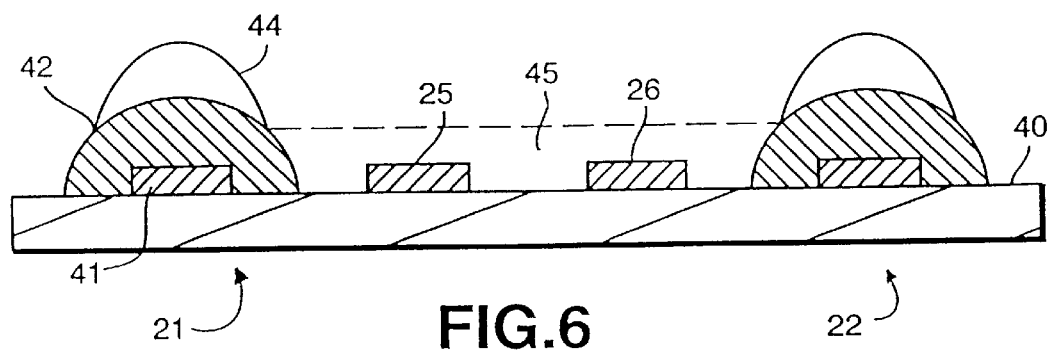
FIG. 6 is a cross-sectional view along the line 6—6 in FIG. 5.

Sensors 21, 22 and 23 (and, if provided, sensor 21a) are not pre-sensitized to a particular color matching function. Rather, those sensors are conventional photosensitive devices which are covered by a filter or other device for separating ambient light into red, green and blue tristimulus values. Thus, as shown in FIG. 6 which is a cross-section taken along line 6—6 of FIG. 5, red sensor 21 and green sensor 22 are each comprised by a conventional photosensing element 41 covered by a filter 42 of appropriate color. Superimposed on each color filter 42 is a lenslet 44 which collects ambient light and inhibits light scattering in the assembly. In this regard, further improvements in sensitivity are obtained if areas away from the photosensing elements are shielded by an opaque layer of material such as the layer indicated illustratively at 45.

In operation, power from an unshown source is provided to the color temperature sensing device, and the correlated color temperature sensing device is placed in position to collect ambient light such as viewing light for viewing a color printout. A user reads the correlated color temperature of the viewing light from indicator 14 and verifies that indicator 15 is not illuminated which would indicate that the viewing light is too hued to be considered white. The user utilizes the correlated color temperature to ensure that color images are viewed under the proper conditions. Thus, in one situation, a user may change the color temperature of the viewing light, for example, by opening shades to outside windows so as to increase the color temperature or by illuminating incandescent bulbs so as to decrease the color temperature. Alternatively, a user may adjust the white point of a color monitor, which is the temperature of the color produced by a color monitor when its red, green and blue guns are generating their maximum signals so that it matches the color temperature of the illuminating ambient light. As yet another example, a user may enter the color temperature into color printing software which operates on the color temperature so as to equalize the colors printed by a color printer to the viewing conditions.

Figures 7, 7A:
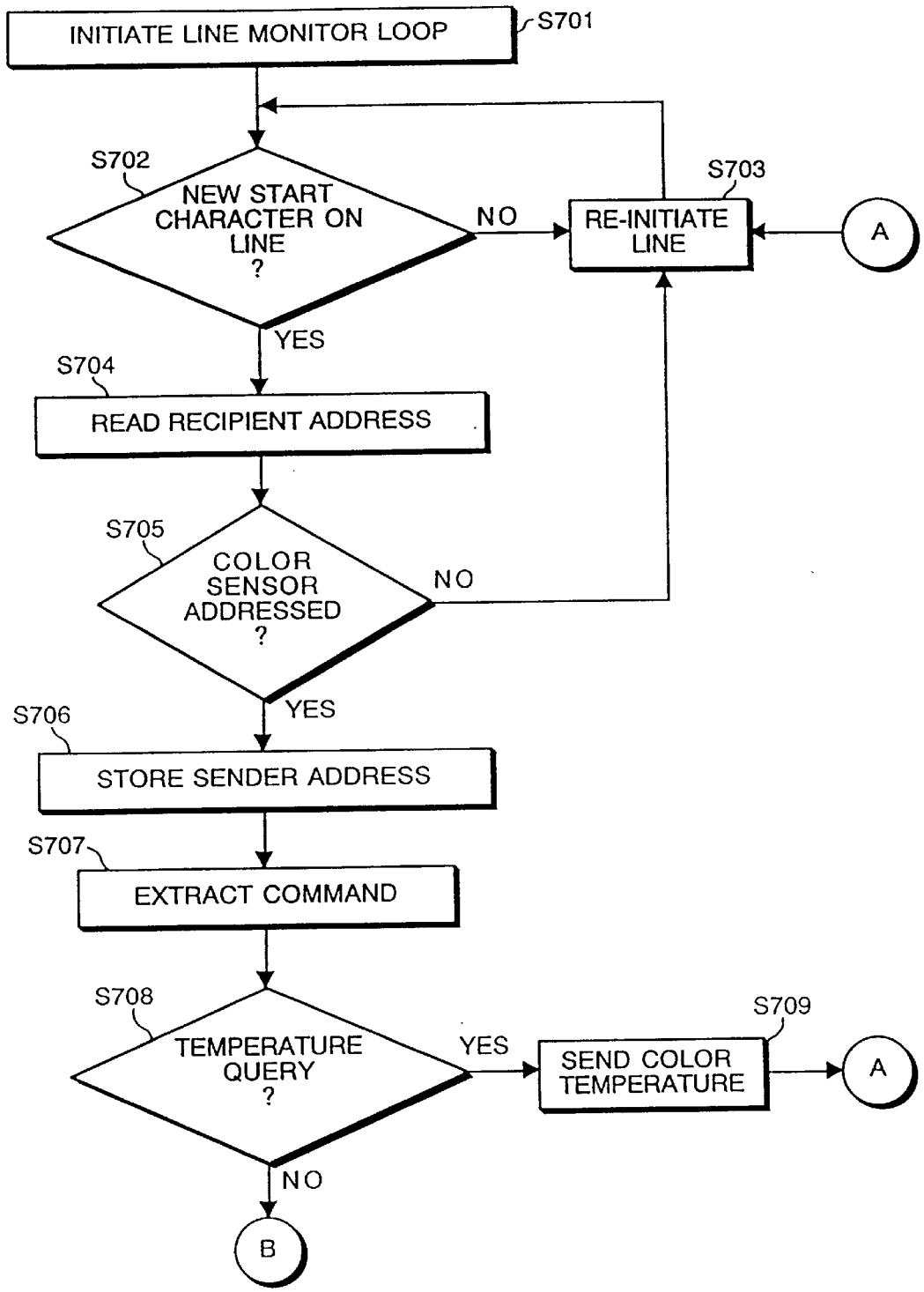
FIG. 7, comprised by FIGS. 7(a) and 7(b), is a flow diagram showing process steps by which the FIG. 3 embodiment interacts with requests on a serial line.
Figure 7B:
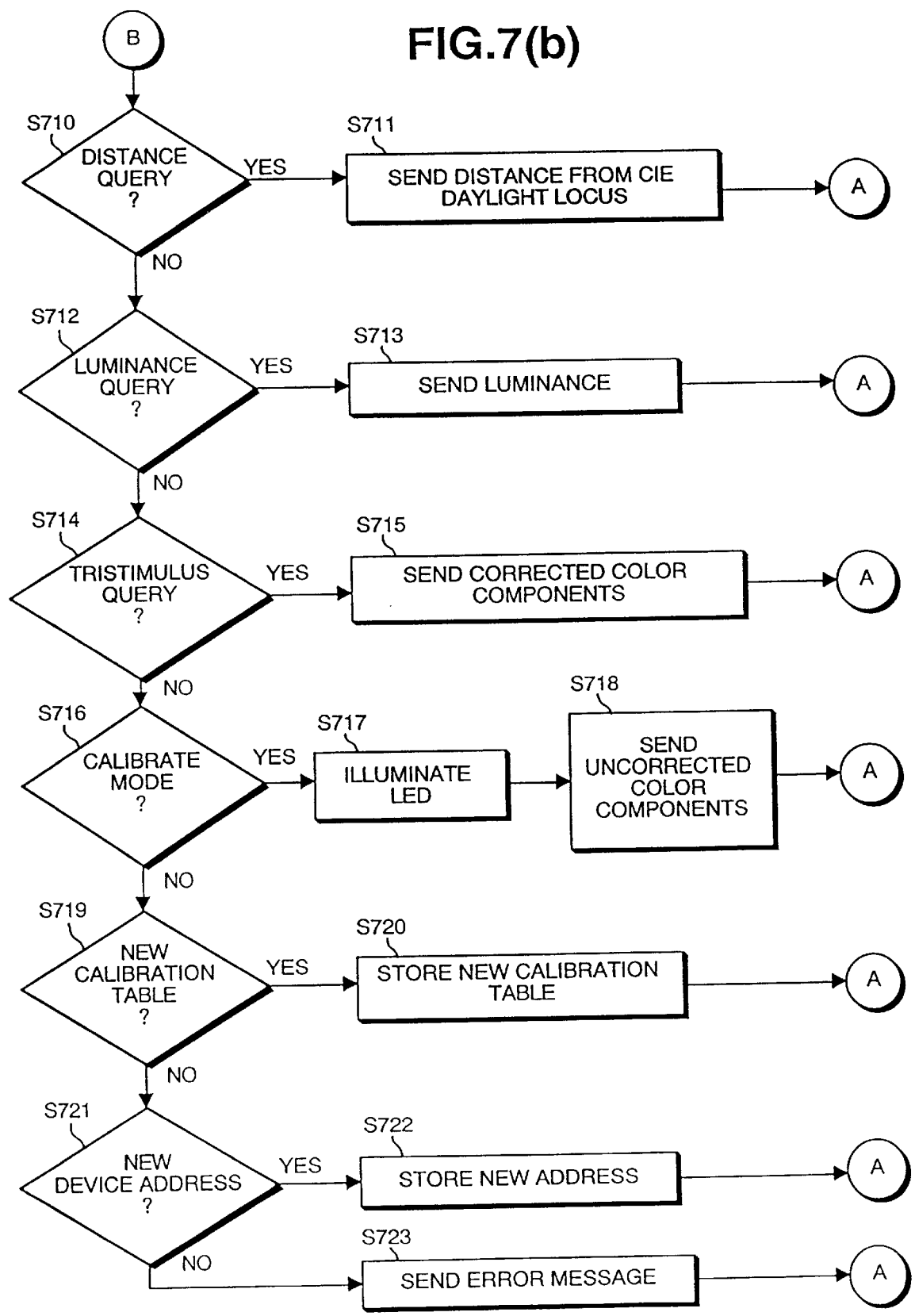

In the case where the color temperature sensor 10 is provided with a serial interface which allows access to other digital equipment, that digital equipment may use the color sensor in accordance with the flow diagram illustrated in FIG. 7.

In step S701, microprocessor 30 initiates its line monitor loop. The line monitor loop monitors the status of serial line 17 until a new start character is detected on the serial line. Until a new start character is detected on the serial line in step S702, microprocessor 30 simply reinitiates its line monitoring operations (step S703) and remains in the line monitor loop until a new start character is detected. When a new start character is detected on the serial line, flow advances to step S704 in which microprocessor 30 reads the address of the recipient from the serial line. In more detail, several serial devices are ordinarily connected to serial line 17. Each of the devices, including the color temperature sensing device 10, is accessed in accordance with a unique address code. Thus, in step S704, microprocessor 30 reads the address code for the recipient from the serial line. If the address code does not correspond to the address of color temperature sensor (step S705), then flow returns to step S703 in which the line monitor loop is reinitiated until a new start character is again detected.

If in step S705 the microprocessor 30 determines that it has been addressed, then flow advances to step S706 in which the sender's address is stored. The sender's address is used by microprocessor 30 in generation of a response. More particularly, microprocessor 30, when generating a serial response for the serial line, will preface that response with the sender's address so that the response of the correlated color temperature device will be directed to the proper recipient.

Step S707 extracts the command which color temperature sensor 10 is to execute. In more detail, microprocessor 30 may be programmed to provide responses to different commands such as a command to provide the temperature on the serial line, a command to enter the calibration mode, a command to receive and to store new correction data in the calibration tables, or a command to reset to a new address. In step S707, the command is extracted.

In step S708, the command is inspected to determine if it is a temperature query. If the command is a temperature query, then microprocessor 30 sends the correlated color temperature corresponding to the current ambient light 24 (step S709) and flow then returns to step S703 where the line monitor loop is reinitiated.

If the command is not a temperature query, then step S710 determines the distance of the correlated color temperature from the white line. If the command is a command to determine the distance, then the distance is displayed in step S711 and flow returns to step S703. If the distance query has not been selected in step S710, but rather a command to inspect luminance is received (step S712), then in step S713 microprocessor 30 sends luminance information out through the serial port.

If the command received is not a command for luminance data, but rather a request for RGB tristimulus values (step S714) then in step S715, the RGB values can be determined and output via the serial port.

If the command is not a temperature query command, then step S716 inspects the command to determine if it is a command to enter the calibration mode. If the command is a command to enter the calibration mode, then microprocessor 30 enters the calibration mode whereby uncorrected color components are transmitted on the serial line 17 (step S718) and, if so provided, microprocessor 30 illuminates LEDs 34 (step S717). As described above in connection with FIG. 3, LED 34 are illuminated to plural different pre-designated illumination levels, and the uncorrected R, G and B components for those illumination levels are transmitted via the serial line 17 to external calibration equipment. Flow thereupon returns to step S703 where the line monitor loop is reinitiated.

If the calibration mode has not been commanded, but rather a command to accept new correction data is received (step S719), then in step S720 microprocessor 30 stores a new correction data into R, G and B calibration tables 31a, 31b and 31c. As described above, these correction data are utilized by microprocessor 30 to correct the digital data from A/D converters 25, 26 and 27 so as to compensate for non-linearities, non-uniformities and other sources of errors in the digital color components. Flow then returns to step S703 where the line monitor loop is reinitiated.

If the command extracted in step S707 is not a command to store a new calibration table, but rather is a command to accept a new device address (step S721) then flow advances to step S722 in which microprocessor 30 stores the new address for device 10. Thereafter, microprocessor will only respond in step S704 to serial inquiries to the new address. Flow then returns to step S703 where the line monitor loop is reinitiated.

The foregoing list of commands is representative only, and other commands may be provided for by microprocessor 30. However, if microprocessor 30 does not recognize the command extracted in step S707, then in step S723 it may be desirable to output an error signal in order to notify the operator that the device is operational.

Figure 8:
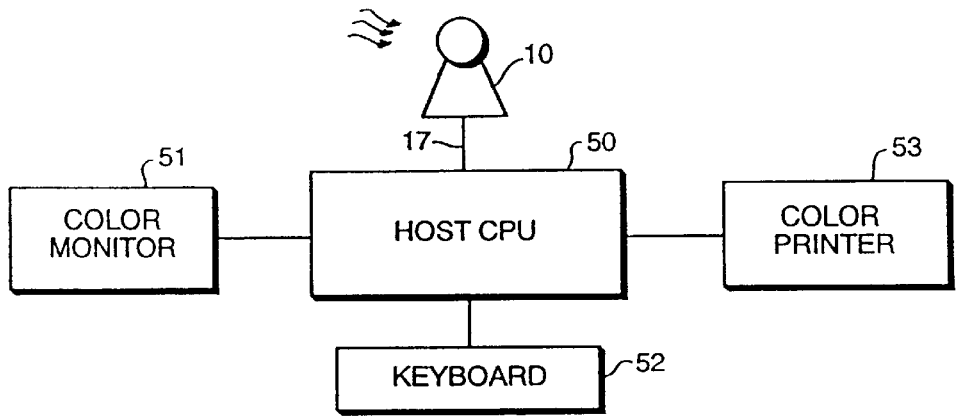
FIG. 8 is a block diagram showing an arrangement by which the colors in a color monitor and a color printer may be adjusted in accordance with the color temperature of viewing light.

FIG. 8 is a constructional view of an arrangement by which computerized feedback is provided whereby the color output of a color monitor or the color images formed by a color printer are equalized properly for ambient viewing conditions. In FIG. 8, host CPU 50, which may be a conventional personal computing system, is provided with a color monitor 51, a keyboard 52 and a color printer 53. A color temperature sensing device 10 is connected to host CPU 50 via a serial interface 17 and is arranged to sense ambient viewing light for either or both of color monitor 51 or color printer 53.

Figure 9:
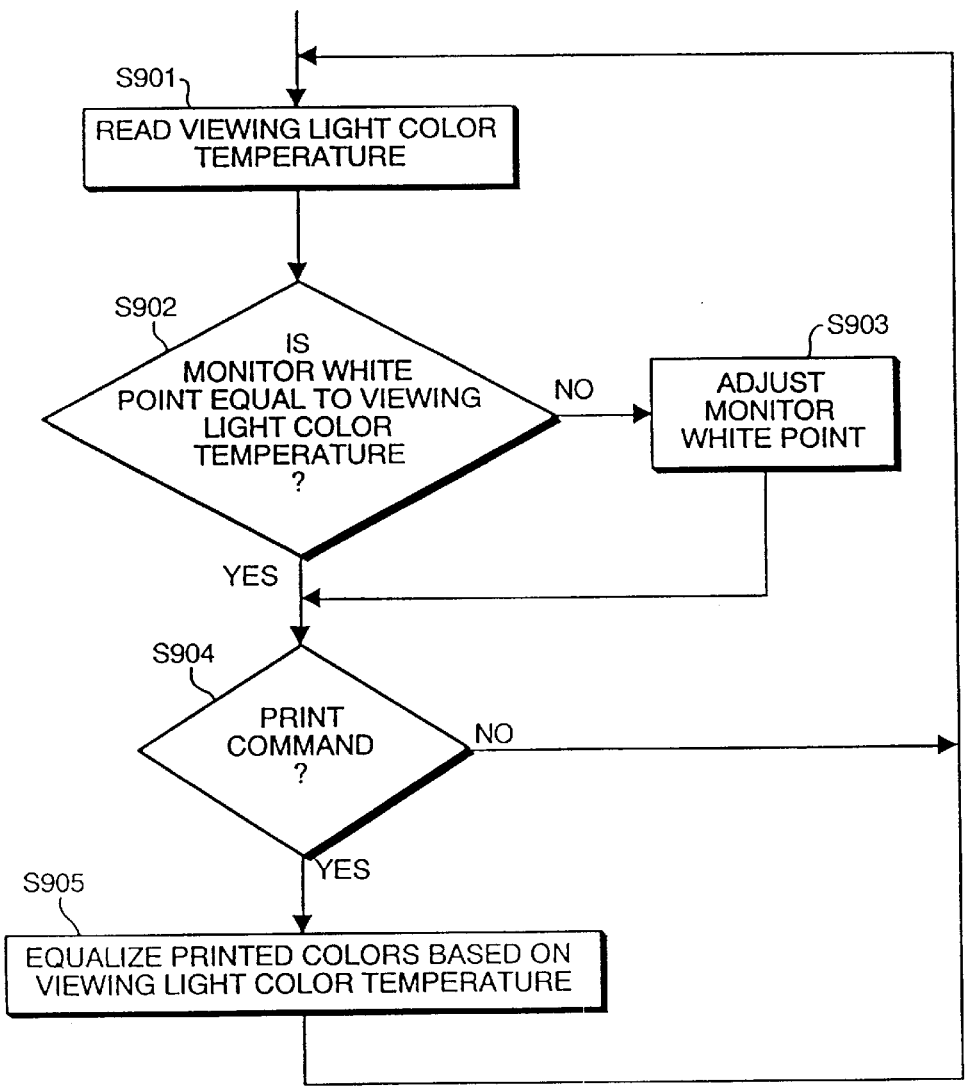
FIG. 9 is a flow diagram showing the process steps for such an adjustment.

FIG. 9 shows process steps executed by host CPU 50 to equalize the color output of monitor 51 or the colors printed by color printer 53 to the ambient viewing light. In step S901, CPU 50 generates a temperature request on serial line 17 which is addressed to correlated color temperature device 10. Color temperature sensing device 10 responds to the serial request as described above in connection with FIG. 7 and, via serial interface 17, returns a digital representation of the color temperature of the viewing light to CPU 50.

In step S902, CPU 50 determines if the monitor white point is equal to the viewing light color temperature. If the monitor white point is not equal to the viewing temperature, then CPU 50 adjusts the monitor white point (step S903) for example, by adjusting the gains of the red, green and blue guns in color monitor 51.

In either case, flow then advances to step S904 in which CPU 50 determines whether a print command has been received for printing a color image on color printer 53. If a print command has not been received, then flow returns to step S901 whereby CPU 50 constantly monitors the temperature of the viewing light and equalizes the white point of color monitor 51. On the other hand, if a print command has been received, then flow advances to step S905 in which CPU 50 adjusts the colors printed by color printer 53 so that they are equalized with the viewing light's color temperature. Equalization of the kind described in the aforementioned Schwartz article may be utilized if desired.

After equalization, flow returns to step S901 and the above operation is repeated.

Figure 10:
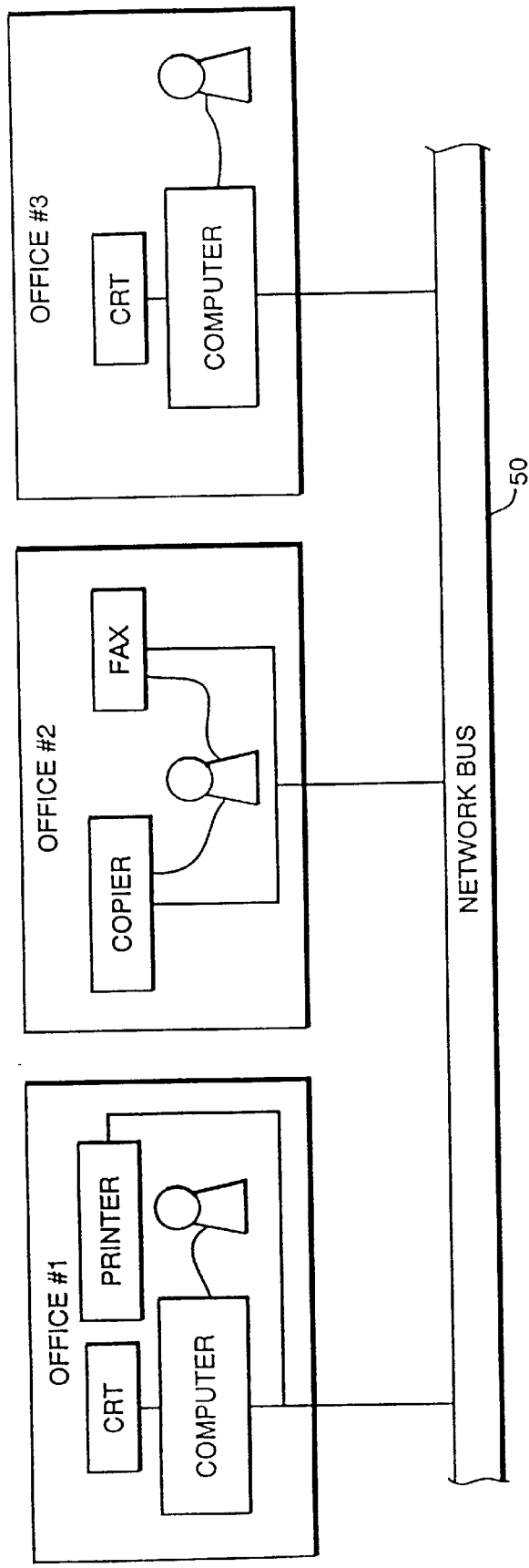
FIG. 10 is a block diagram view showing the arrangement of plural color temperature sensors in different physical locations.

FIG. 10 shows an arrangement in which plural color temperature sensors are arranged in different locations such as in different offices in a place of business. Each of the color temperature monitors is provided with a different serial address and each is connected to a serial interface to network bus 50. By virtue of the foregoing arrangement, it is possible for a user in a first location such as in Office 1, who desires to view a color image in a different location, such as during a conference or a meeting in Office 2, to read the correlated color temperature in the viewing light by causing a temperature request to be addressed to the color temperature sensor in Office 2. Based on the correlated color temperature returned by the color temperature sensor in Office 2, the user in Office 1 may modify the color printout on his printer so that the color image so generated will be equalized with the viewing conditions in Office 2.

In like manner, a user such as that in Office 2 who is not provided with a personal color printer may direct his color printer output to a central location such as that shown in Office 3. In this instance, the Office 2 user reads his correlated color temperature sensor before queuing a color print output, and the color print output is equalized using the Office 2 correlated color temperature, thereby providing for the proper viewing conditions when the Office II user returns to his office.

Office 3 is provided with its own color temperature sensor. This color temperature sensor is utilized by the Office 3 color copier and the color facsimile unit in a manner similar to that illustrated in FIG. 9 so as to equalize the color outputs of the color copier and the color facsimile to the ambient viewing light.

Figure 11:
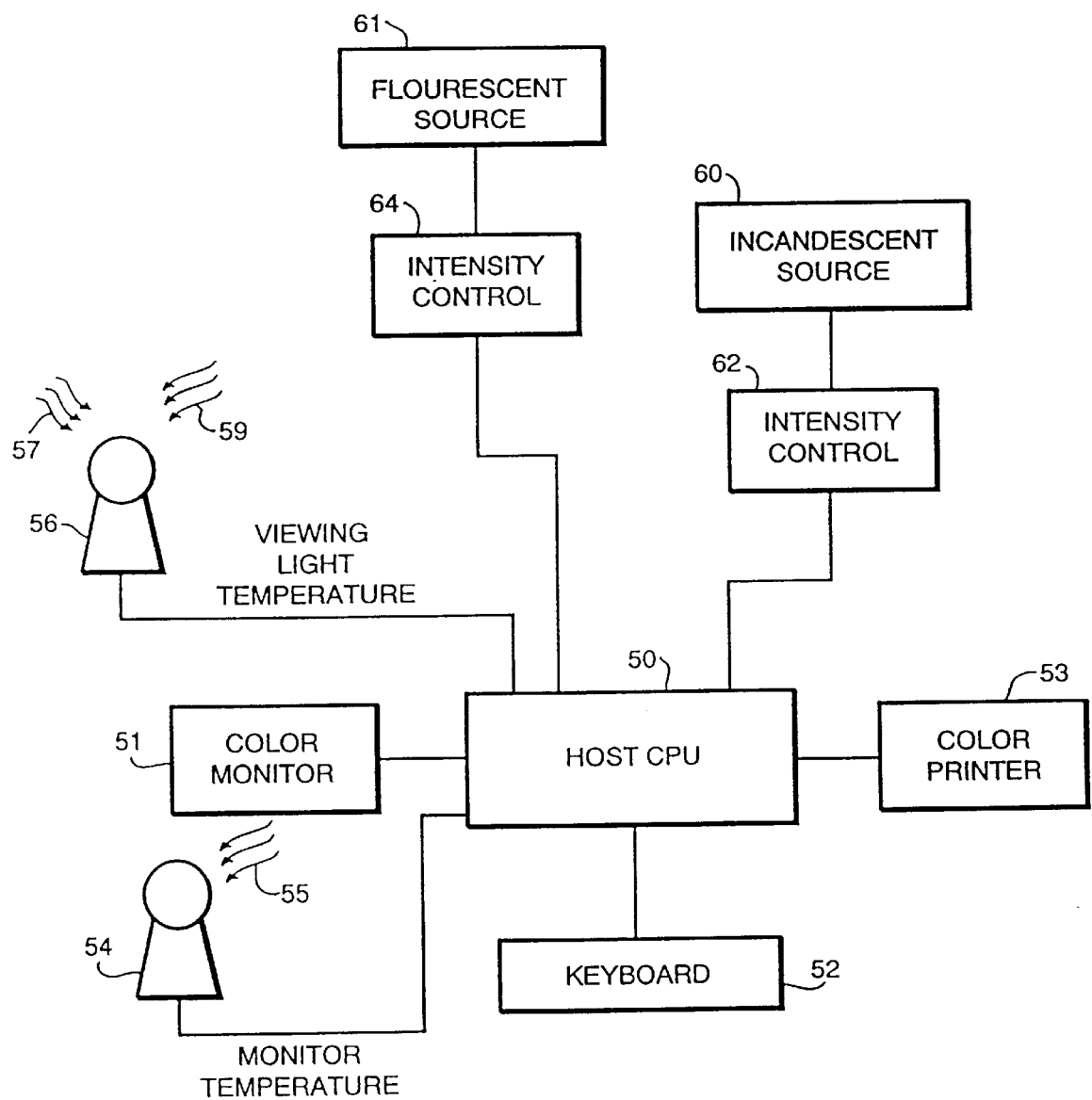
FIG. 11 is a block diagram view showing an arrangement by which viewing light temperature and another color temperature may be matched to each other.

FIG. 11 depicts an arrangement for matching viewing light temperature with the temperature of another light, such as the white point of a color monitor, or a standard day light simulator such as D50. In FIG. 11, host CPU 50 is provided with a color monitor 51, a keyboard 52 and a color printer 53. A color temperature sensing device 54 is provided to sense light 55 from color monitor 51 and to provide host CPU 50 with the white point temperature of monitor 51. A color temperature sensor 56 is provided in an area away from color monitor 51 so as to sense viewing light in the area. The viewing light is a combination of ambient light 57, such as light from exterior windows, in combination with light 59 which is from at least one controllable light source. In the configuration shown in FIG. 11, light 59 is from two light sources, namely incandescent source 60 or some other source having a relatively low color temperature and fluorescent source 61 or some other source having a relatively high color temperature. The light intensity from each of sources 60 and 61 is independently controllable via intensity control devices 62 and 64. Intensity controls 62 and 64 may be fabricated from digitally controllable dimmer switches which are operable under digital control from host CPU 50.

Figure 12:
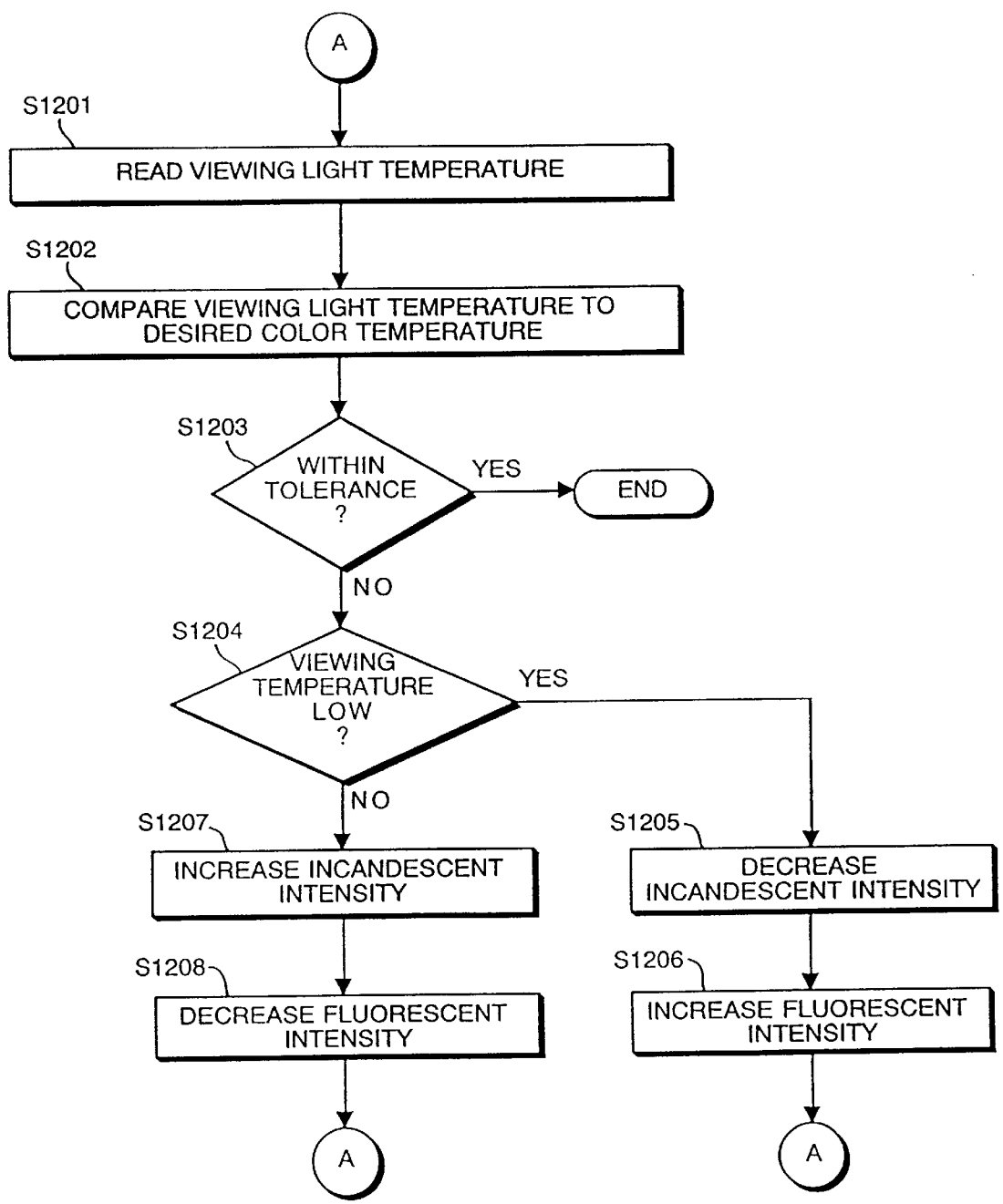

FIG. 12 is a flow diagram showing how the viewing light color temperature and another light's temperature are matched. In the flow diagram of FIG. 12, the viewing light is adjusted until the correlated color temperature of the viewing light adequately simulates a desired standard illuminant such as D50.

In step S1201, CPU 50 reads the viewing light color temperature from color temperature sensor 56 in accordance with the flow diagram depicted in FIG. 7. In step S1202, CPU 50 compares the viewing light temperature to the desired light temperature such as D65. If in step S1203 the viewing light temperature is approximately the desired temperature, then flow ends. On the other hand, if the viewing light temperature is lower than the desired color temperature (step S1204), then the viewing light color temperature is raised by increasing the color temperature of controllable light 59. In the embodiment depicted here, this may be achieved either by decreasing the intensity of incandescent source 60 (step S1205) or by increasing the intensity of fluorescent source 61 (step S1206), or by any combination thereof. These adjustments may be made by CPU 50 through incremental control of intensity controls 62 and 64 whereby only incremental or step-wise changes are made in the color temperature of light 59. Flow then returns to step S1201 in which the color temperature of the viewing light is again read to determine if it has been brought to a level where it is equal to the temperature of the desired color temperature.

If in step S1204, it is determined that the viewing temperature is higher than that of the desired correlated color temperature, then the viewing light temperature must be lowered by lowering the correlated color temperature of adjustable light 59. In the embodiment depicted here, this may be achieved either by increasing the intensity of incandescent source 60 (step S1207) or by decreasing the intensity of fluorescent source 61 (step S1208) or by an combination thereof. As mentioned above, CPU 50 can effect these changes through digital control of intensity controls 62 and 64, and preferably those changes are made incrementally or stepwisely so as to effect only an incremental or stepwise change in the color temperature of light 59. Flow thereupon returns to step S1201 so as to determine whether the desired color temperature has been achieved.

Figure 13:
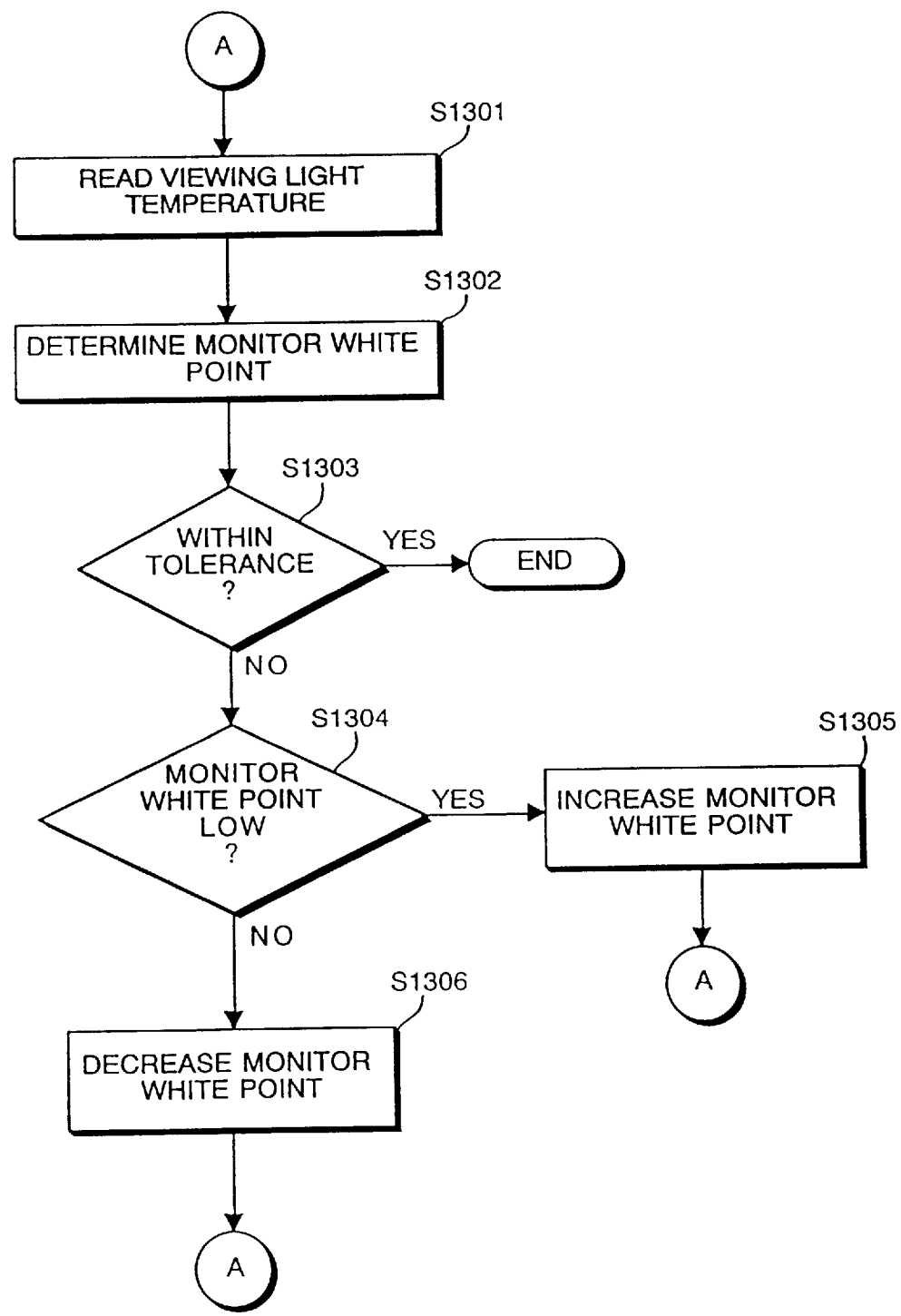

FIG. 13 is a flow diagram showing another example for matching the correlated color temperature for the viewing light to another correlated color temperature. In the flow depicted in FIG. 13, the color temperature of the viewing light is not adjusted, but rather the white point of monitor 51 is adjusted until it is the same as the color temperature of the viewing light.

Thus, in step S1301, CPU 50 reads the color temperature of the viewing light from color temperature sensor 56. In step S1302, CPU 50 determines the color temperature of light 55 from monitor 51 from color temperature sensor 54. In step S1303 CPU 50 determines whether the color temperatures are within a predetermined tolerance. If the color temperatures are acceptable, then flow ends. On the other hand, if the color temperature of monitor 51 is low (step S1304), then flow advances to step S1305 in which the white point of the color monitor is increased, such as by increasing the gain of the blue gun or by decreasing the gain of the red gun in the color monitor. The change may be made incrementally or stepwisely thereby permitting the color temperatures of the viewing light and the monitor to be matched iteratively. Flow thereupon returns to step S1301.

On the other hand, if the color temperature of monitor 51 is greater than the color temperature of the viewing light, then flow advances to step S1306 in which the correlated color temperature of monitor 51 is decreased, such as by decreasing the gain of the blue gun or increasing the gain of the red gun of color monitor 51. Again, the change in color temperature may be made incrementally so as to achieve corresponding incremental decreases in the color temperature of the monitor, whereby the color temperature of the monitor and the viewing light are matched iteratively.

Figure 14:
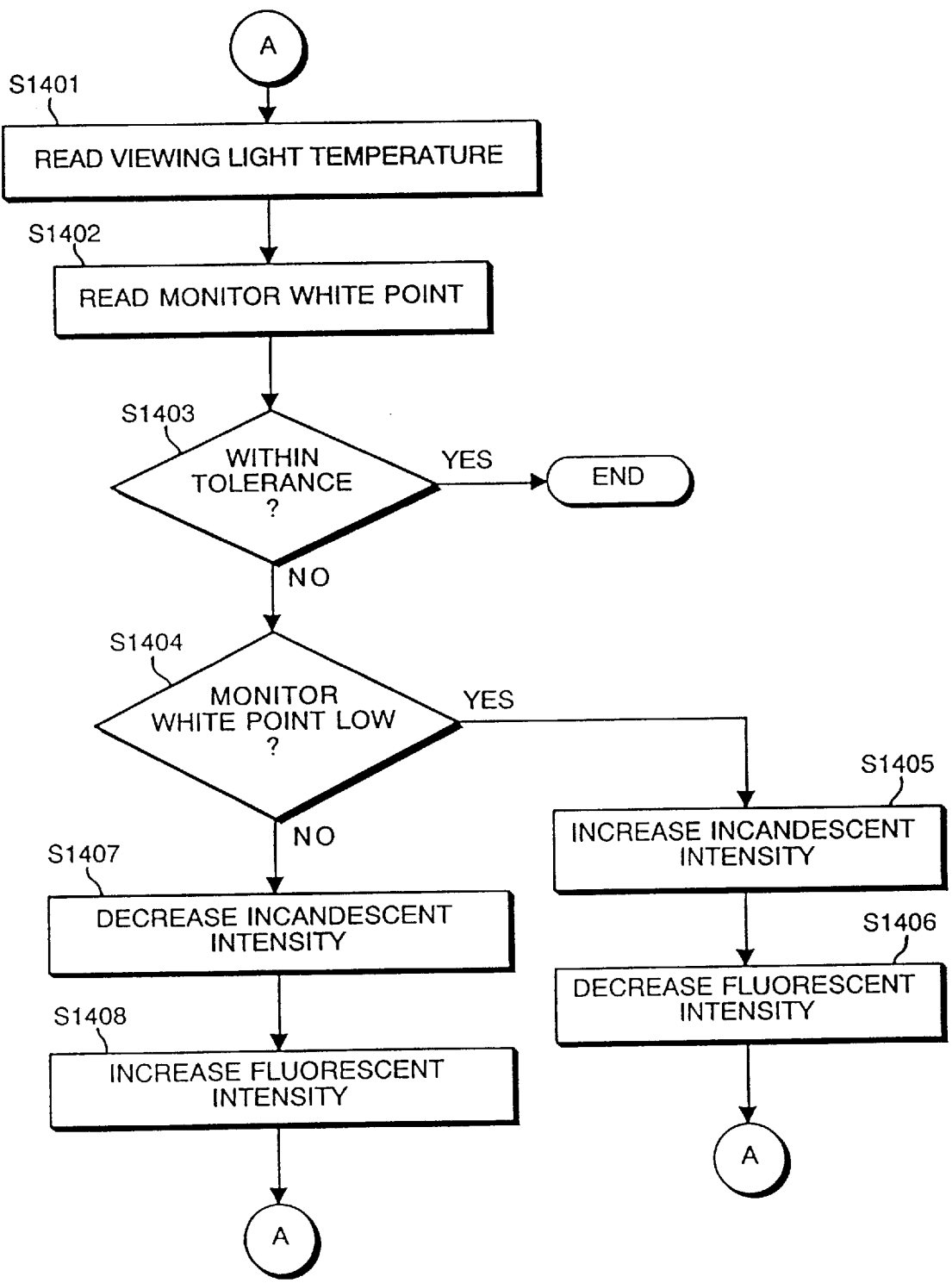

FIG. 14 is a further example of a method for matching the color temperatures of the viewing light and that of another light. In the example of FIG. 14, the color temperature of the viewing light is adjusted so as to match the color temperature of that of monitor 51.

Steps S1401 through S1404 are identical to steps S1301 through S1304.

If in step S1404 CPU 50 determines that the correlated color temperature of the monitor is lower than the correlated color temperature of the viewing light, then the color temperature of the viewing light is decreased by decreasing the color temperature of light 59. In the example herein, this is achieved by increasing the intensity of incandescent source 60 or by decreasing the intensity of fluorescent source 61, or any combination thereof. Any such adjustments are made by CPU 50 through intensity controls 62 and 64 and preferably made incrementally so as to achieve iterative color temperature matching. Flow thereupon returns to step S1401.

On the other hand, if CPU 50 determines in step S1404 that the color temperature of the monitor is higher than that of the viewing light, then flow advances to steps S1407 and S1408 in which the color temperature of the viewing light is increased by increasing the color temperature of light 59. In this example, the color temperature of light 59 is increased by decreasing the intensity of incandescent light source 60 (step S1407) or by increasing the intensity of fluorescent source 61 (step S1408) or any combination thereof. CPU 50 affects these adjustments incrementally via intensity controls 62 and 64 so as to achieve color matching iteratively. Flow then returns to step S1401.

In FIG. 13, only the color temperature of the monitor was adjusted and in FIG. 14 only the color temperature of the viewing light was adjusted, but it is to be understood that a combination of these effects may be utilized in matching the color temperature of the viewing light to the color temperature of the monitor. That is, it is possible to change the white point of the color 51 and also to change the color temperature of light 59 in combination so as to achieve a match between the color temperature of the viewing light and the color temperature of the monitor.

What is claimed is:

1. A method of matching the color temperature of viewing light and the color temperature of a color monitor comprising the steps of:

reading the color temperature of the viewing light;

comparing the color temperature of the viewing light to the color temperature of the monitor; and matching the color temperature of the viewing light to the color temperature of the monitor based on the results of said comparison step.

2. A method according to claim 1, further comprising an adjustment step for adjusting the white point of said color monitor.

3. A method according to claim 2, wherein said adjusting step comprises the step of decreasing the color temperature of the viewing light in the case where the color temperature of the viewing light is higher than the color temperature of the monitor and the step of increasing the color temperature of the viewing light in the case where the color temperature of the viewing light is lower than the color temperature of the monitor.

4. A method according to claim 2, wherein the white point of the monitor is increased in the case where the color temperature of the monitor is lower than the color temperature of the viewing light and wherein the white point of the monitor is decreased in the case where the color temperature of the monitor is greater than the color temperature of the viewing light.

5. A method according to claim 4, wherein said step of decreasing the color temperature of the viewing light comprises the step of decreasing the intensity of an incandescent source and/or increasing the intensity of a fluorescent source.

6. A method according to claim 4, wherein said step of increasing the color temperature of the viewing light comprises the step of increasing the intensity of an incandescent source and/or decreasing the intensity of a fluorescent source.

7. A method according to claim 1, wherein in said matching step, the color temperature of the viewing light is adjusted.

8. A method according to claim 1, wherein said matching step includes the step of adjusting both the white point of the color monitor and the color temperature of the viewing light.

* * * * *